| United States Patent [19] | [11] Patent Number: 4,609,591 |
| Pollet et al. | [45] Date of Patent: Sep. 2, 1986 |

[54] NON-AQUEOUS COATING FOR GLASS FIBERS AND GLASS FIBERS COATED THEREWITH

[75] Inventors: Jean-Claude Pollet, Granville; Gordon P. Armstrong, Newark; Martin C. Flautt, Granville, all of Ohio

[73] Assignee: Owens-Corning Fiberglas Corporation, Toledo, Ohio

[21] Appl. No.: 732,778

[22] Filed: May 10, 1985

[51] Int. Cl.$^4$ .............. C08K 9/06; C08K 5/35; B32B 9/00; B32B 25/20

[52] U.S. Cl. ............... 428/391; 252/301.24; 252/301.35; 523/203; 523/206; 523/214; 524/87; 524/94; 524/477; 524/488; 524/517

[58] Field of Search ............... 428/391; 523/203, 206, 523/214; 524/488, 478, 517, 87, 94; 252/301.24, 301.35

[56] References Cited

U.S. PATENT DOCUMENTS

| 4,210,570 | 7/1980 | Trotter et al. | 524/528 |
| 4,238,384 | 12/1980 | Blumberg et al. | 252/301.35 |
| 4,240,944 | 12/1980 | Temple | 428/391 |
| 4,288,358 | 9/1981 | Trotter et al. | 524/579 |
| 4,460,728 | 7/1984 | Schmidt et al. | 524/489 |
| 4,487,876 | 12/1984 | Pokorny | 524/390 |
| 4,500,600 | 2/1985 | Wong et al. | 428/391 |

*Primary Examiner*—Herbert J. Lilling
*Attorney, Agent, or Firm*—Ronald C. Hudgens; Patrick P. Pacella

[57] ABSTRACT

A non-aqueous coating for glass fibers consisting of 100 percent solids formulation of organosilane, an ethylene-ethyl acrylate copolymer, a hydrogenated heterocyclic hydrocarbon thermoplastic resin, a microcrystalline wax, a viscosity-reducing agent, an antioxidizing agent, and a whitening agent. When employing glass fibers coated with the size composition of the present invention in a non-acid modified polypropylene resin, the size formulation also includes a maleic anhydride-modified polyolefin. Glass fibers coated with the size composition of this invention are suitable for use in reinforcing resinous products, particularly polypropylene, to achieve a white or translucent molded glass fiber-reinforced product.

13 Claims, No Drawings

NON-AQUEOUS COATING FOR GLASS FIBERS AND GLASS FIBERS COATED THEREWITH

FIELD OF THE INVENTION

The present invention relates to non-aqueous coating compositions for glass fibers and, particularly, to hot melt coating compositions which can be applied to glass fibers in forming so that the resulting coated glass fibers can be utilized for the reinforcement of articles molded from a white or translucent polymeric material.

CROSS-REFERENCE TO RELATED APPLICATIONS

Further insight into hot melt coatings for glass fibers to which the present invention pertains can be gained by referring to commonly-owned and copending U.S. application Ser. Nos. 613,846 filed May 24, 1984, now U.S. Pat. No. 4,581,392, 613,940 filed May 24, 1984, now U.S. Pat. No. 4,567,102, and Ser. No. 732,777 filed May 10, 1985 filed even date herewith, each of which has been filed in the names of Jean-Claude Pollet, Gordon P. Armstrong, and Martin C. Flautt (the entire disclosure of each application being expressly incorporated hereinto by reference).

BACKGROUND OF THE INVENTION

Bare glass fibers are substantially smooth rod-like members having surfaces which are highly hydrophilic in nature and thus will not typically exhibit a bonding relationship with polymeric materials sufficient to provide reinforcement properties thereto. That is, the lack of bonding between the bare glass fibers and the polymeric material causes the glass fibers and the polymeric material to separate from one another and thus are not useful for the manufacture of glass-reinforced product. It is conventional, therefore, to apply a thin layer of an aqueous size composition to the surfaces of the bare glass fibers, which composition is compatible with and serves to improve the bonding relationship between the glass fibers and the polymeric material. A thin layer of size composition serves an additional beneficial function. That is, during processing of the glass fibers into a form suitable for use as reinforcement for polymeric products, the fibers are exposed to abrasive contact with structural components utilized during processing. The size composition layer, therefore, also serves to protect the underlying bare glass fiber from abrasion damage which could otherwise occur during processing.

Sizing compositions typically employed as coatings for glass fibers have conventionally been aqueous-based formulations. The glass fibers are typically sized as formed, collected into a strand, and the strand is then wound around a take-up bobbin to form a substantially cylindrical package (conventionally termed a "yarn package"). The yarn package is then air dried or subjected to elevated temperatures so as to dry the aqueous size composition applied to the surfaces of the glass fibers forming the strand. In this regard, attention is directed to U.S. Pat. No. 3,816,235 which is expressly incorporated hereinto by reference.

As the reader can appreciate, considerable time and expense would be saved if a size could be employed which requires no drying and which could be directly blended into the polymeric material and molded therewith to provide satisfactory reinforcement. Our copending application Ser. Nos. 613,846 and 613,940 each filed on Mar. 24, 1984 relate to such desirable glass size compositions in that there is disclosed therein a non-aqueous, 100% solids formulation of a hot melt size for use in coating glass fibers so that the coated glass fibers can be satisfactorily employed as reinforcing media in an polymeric resin matrix.

The present invention is directed to a similar genre of hot melt coatings for glass fibers described in Ser. Nos. 613,846 and 613,940 in that it relates to a non-aqueous 100% solid hot melt formulation for coating glass fibers. The specific improvement of this invention, however, relates to a hot melt formulation suitable for direct blending with a white thermoplastic resin such that the coated fibers will not detract from the visible whiteness of the resulting glass fiber-reinforced product.

Accordingly, there is provided by the present invention a non-aqueous coating for glass fibers consisting of a 100% solids formulation of an organosilane, a maleic anhydride-modified polyolefin, a hydrogenated hydrocyclic hydrocarbon thermoplastic resin, an ethylene-ethylacrylate copolymer, a microcrystalline wax, a viscosity-reducing agent, an antioxidizing agent, and a whitening agent. The coating of this invention can thus be applied as a size for glass fibers and the resulting sized glass fibers can be incorporated into a compatible polymeric resin matrix to provide a glass-fiber reinforced product.

These and other aspects and advantages of the present invention will become more clear to the reader after consideration is given to the detailed description of the preferred exemplary embodiments thereof which follow.

DETAILED DESCRIPTION OF THE PREFERRED EXEMPLARY EMBODIMENTS

The present invention is employable with any glass fiber conventionally utilized for the reinforcement of polymeric resins. The term "glass fibers" as used herein shall mean filaments formed by attenuation of one or more streams of molten glass and to strands formed when such glass fiber filaments are gathered together in forming. The term shall also mean yarns and cords formed by applying and/or twisting a multiplicity of strands together and to woven and non-woven fabrics which are formed of such glass fiber strands, yarns, or cords. Preferably, the size formulation of the present invention is usable with E-type fibers having a diameter in the range of from about 0.35 to about 0.75 mil.

The individual components utilized in the practice of this invention are commercially available and can thus be simply blended with one another in the preparation of the formulations embodying the features of the present invention.

The hot melt size of this invention is a 100% solids formulation applied as a hot melt to the glass fibers as they are formed; that is, at or about the place in their formation at which aqueous sizes are typically applied (e.g., between the bushing and the collet on which the fibers are wound as a package). Preferably, the hot melt size of this invention is applied in accordance with the invention described in commonly-owned and copending U.S. Ser. No. 613,847 filed May 24, 1984 now U.S. Pat. No. 4,537,610 issued on Aug. 27, 1985 (incorporated hereinto expressly by reference).

Any suitable silane conventionally employed in aqueous-base glass size compositions can also be employed in the hot melt size composition of the present invention. Preferably, the silane is an organosilane including gamma-methacryloxypropyltrimethoxysilane commercially available from Union Carbide under the tradename "A 174." The organosilane will be employed in an amount within the range of from about 0.1 to about 4.0 parts by weight of the coating, and preferably in an amount between about 0.5 to about 2.0 parts by weight of the coating.

Any suitable ethylene-ethyl acrylate copolymer can be employed in the successful practice of this invention. Preferably, the copolymer will have a melt index (ASTM D-1238 gram/10 minutes) of about 20, a density of about 0.93 gram/cc, a flexural modulus and secent modulus of elasticity of about 9,000 and 4,300, respectively (determined on 0.075 inch compression molded placques), an ultimate elongation of about 750 percent, a tensile strength of about 700 psi, and a Durometer Hardness "A" of about 86. The ethylene-ethylacrylate copolymer will preferably be employed in an amount within the range of from about 5.0 to 35.0 parts per weight of the coating and preferably between about 15.0 to 25.0 parts by weight. One suitable ethylene-ethylacrylate copolymer is Bakelite ® DPDA-9169 commercially available from the Union Carbide Corporation, Danbury, Conn.

The hydrogenated heterocyclic hydrocarbon thermoplastic resin utilized in the formulation of the present invention will preferably have a ring and ball softening point of about 100° C., a color (Gardner 50 percent toluene) of less than 1.0, and a specific gravity of 0.97. Particularly preferred for use in the formulation of the present invention is a hydrogenated heretocyclic hydrocarbon thermoplastic resin commercially available from Reichold Chemicals, Inc., Newport Division, Pensacola, Fla., under the tradename "SUPER NI-REZ TM 5100." The hydrogenated heterocyclic hydrocarbon thermoplastic resin will be preferably employed in the formulation of the present invention in an amount between about 5.0 to 60.0 parts by weight of the coating and preferably between about 15.0 to 25.0 parts by weight of the coating.

Any suitable microcrystalline wax can be employed in the successful practice of this invention. Preferably, the wax will have a melting point of about 200° F., a penetration (ASTM D-1321 at 77° F.) of about 0.5 mm, a SUS viscosity (ASTM D-88 at 210° F.) of about 78, a viscosity (ASTM D-3236) of about 12 cps, and a specific gravity at 75° F. of about 0.93. One particularly suitable microcrystalline wax is Petrolite ® C-1035 available from Bareco, ® a division of the Petrolite Corporation, Tulsa, Okla. The microcrystalline wax will be contained in the formulation of the present invention in an amount within the range from about 10.0 to about 80.0 parts by weight of the coating and preferably within a range of between about 30.0 to about 50.0 parts by weight.

In order to improve processability and application of the hot melt size formulation of the present invention, it is preferred to employ a viscosity-reducing agent. Any suitable low viscosity/high temperature oil can be utilized in the successful practice of the present invention. One particularly preferred viscosity-reducing agent is Tufflo 6006 commercially available from Atlantic Richfield Company. The viscosity-reducing agent will preferably be employed in the hot melt size formulation of the present invention in an amount between about 0.2 to about 10.0 parts by weight of the coating and preferably in an amount of between about 2.0 to about 5.0 parts by weight.

An antioxidizing agent is preferably included so as to prevent oxidation and thus discoloration of the size formulation so that it retains its white color characteristic over extended periods of time. Any suitable antioxidizing agent can be employed in the formulations of the present invention. Examples of suitable antioxidizing agents include those described in U.S. Pat. Nos. 3,285,855 and 3,644,482, the entire of disclosure of each being expressly incorporated hereinto by reference. One particularly preferred antioxidant is "1010" (CAS No. 6683-19-8) commerically available from the Ciba-Geigy Corporation. Such an antioxidant is 2,2-bis[[3-[3,5-bis(1,1-Dimethylethyl)-4-hydroxphenyl]-1-oxopropoxy]methyl]-1,3-propanediyl 3,5-bis(1,1-dimethylethyl)-4-hydroxybenzenepropanoate.

The whitening agent employable in the formulations of the present invention can be any chemical agent employed for such purposes. Particularly preferred for use in the formulations of the present invention are tertiary butyl benzoxazoles. One suitable whitening agent employable in the present invention is 2,2'-(2,5-thiophenediyl) bis(5-tert-butylbenzoxazole) which is commercially available from the Ciba-Geigy Corporation, Plastics and Additives Division, under the tradename "Uvitex OB." The whitening agent will preferably be employed in the formulations of this invention in an amount ranging between about 0.025 to about 2.5 parts by weight of the coating and preferably in an amount between about 0.1 to about 1.0 parts by weight.

The sizing composition of the present invention when coated upon glass fibers is particularly suitable for reinforcing white polypropylene resin products. When the polypropylene resin is a non-acid modified polypropylene resin, it is necessary to include in the hot melt size formulation an acid or an anhydride modified polypropylene.

The hot melt size composition can employ any suitable chemically modified polyolefin. Preferably, the polyolefin is a maleic anhydride-modified polyolefin having a weight average molecular weight of about 4,500, a ring and ball softening point of about 150° C., a penetration (ASTM D5, 100 g for 5 s at 25° C.) of 0.1 mm, a density of about 0.93 g/cc, and will be solid up to above 302° F. and will have a Brookfield Viscosity (Thermosel) of about 400 cps at 190° C. The chemically-modified polyolefin will also preferably have a color (Gardner scale) of about 11 or less and an acid number of about 47. One particularly preferable chemically modified polyolefin is "Epolene E43" which is an emulsifiable wax commerically available from Eastman Chemical Products, Inc., Kingsport, Tenn. The chemically-modified polyolefin will be employed in the formulation of the present invention in an amount within the range of from about 1.0 to about 60.0 parts by weight and preferably in an amount between about 3.0 to about 30.0 parts by weight of the size formulation.

When a non-acid modified polypropylene resin is to be reinforced with glass fibers coated with the size of the present invention, the following composition has been found to be particularly effective:

| Component | Parts by Weight |
|---|---|
| Chemically modified polyolefin | 19.0 |
| Ethylene-ethyl acrylate (DPDA 9169) | 21.0 |
| Organosilane (A 174) | 2.0 |

-continued

| Component | Parts by Weight |
|---|---|
| Microcrystalline wax (Petrolite C1035) | 35.5 |
| Hydrogenated heterocyclic hydrocarbon thermoplastic resin (super Nirez 5100) | 18.0 |
| Viscosity-Reducing Agent (Tufflo 6006) | 3.75 |
| Antioxidizing agent | 0.5 |
| Whitening agent | 0.25 |

While reference has been made to preferred formulations in accordance with the present invention, those in this art may recognize that various modifications may be made, which modifications shall be accorded the broadest scope of the appended claims so as to encompass all equivalent formulations, compositions, and the like.

What is claimed is:

1. A non-aqueous coating for glass fibers consisting essentially of 100% solids formulation of an organosilane, ethylene-ethylacrylate copolymer, a hydrogenated heterocyclic hydrocarbon thermoplastic resin, a microcrystalline wax, a viscosity-reducing agent of a low viscosity/high temperature oil, an antioxidizing agent, and a whitening agent.

2. A non-aqueous coating composition as in claim 1 wherein said whitening agent is a tertiary butylbenzoxazole.

3. A non-aqueous coating composition as in claim 2 wherein the whitening agent is 2,2'(2,5-thiophenediyl)-bis(5-tert-butylbenzoxasole).

4. A non-aqueous composition as in claim 3 wherein the whitening agent is present in an amount between about 0.025 and 2.5 parts by weight.

5. A non-aqueous coating as in claim 1 wherein said coating further includes a maleic anhydride modified polyolefin.

6. A non-aqueous coating as in claim 1 wherein the ethylene-ethyl acrylate copolymer has a melt index of about 20.

7. A non-aqueous coating as in claim 5 wherein said polyolefin has a weight average molecular weight of about 4,500 and an acid number between about 45 and about 90.

8. A non-aqueous coating as in claim 1 wherein said organosilane is gamma-metacryloxypropyltrimethoxy silane.

9. A non-aqueous coating as in claim 1 wherein said hydrogenated heterocyclic hydrocarbon thermplastic resin is present in an amount between about 5.0 to about 60 parts per 100 parts of the formulation.

10. A non-aqueous coating as in claim 9 wherein said hydrogenated heterocyclic hydrocarbon thermoplastic resin has a sofening point (B&R) of 100° C., and a color (Gardner 50 percent toluene) of less than 1.0 and a special gravity of 0.97.

11. A non-aqueous coating composition for glass fibers which consists of the following, in approximate parts by weight:
(a) organosilane: 2.0
(b) ethylene-ethylacrylate copolymer: 20.75
(c) malaic anhydride-modified polyolefin: 19.0
(d) hydrogenated heterocyclic hydrocarbon resin: 18.0
(e) microcrystalline wax: 35.75
(f) viscosity-reducing agent of a low visosity/high temperature oil: 3.75
(g) antioxidizing agent: 0.75
(h) whitening agent: 0.25

12. A glass fiber having a non-aqueous size coating applied thereto for the reinforcement of an polymeric resin, said coating consisting essentially of an organosilane, an ethylene-ethylacrylate copolymer a hydrogenated heterocyclic hydrocarbon thermoplastic resin, a microcrystalline wax, a viscosity-reducing agent of a low viscosity/high temperature oil, an antioxidizing agent and a whitening agent.

13. A glass fiber as in claim 12 wherein said coating further includes a malaic anhydride-modified polyolefin.

* * * * *